United States Patent Office 2,926,161
Patented Feb. 23, 1960

2,926,161

LINEAR HOMOPOLYMERS OF DIALLYL AMINES

George B. Butler, Gainesville, Fla., Rudolph J. Angelo, Wilmington, Del., and Allan Crawshaw, Gainesville, Fla., assignors to Peninsular Chem Research, Inc., Gainesville, Fla., a corporation of Florida No Drawing. Application March 10, 1958
Serial No. 720,092

15 Claims. (Cl. 260—89.7)

This invention relates to linear organic saturated non-ionic homopolymers which are formed directly from hydrohalide salts of symmetrical 1,6-diolefinic-substituted secondary and tertiary amine monomers. These polymers are characterized by recurring six-membered rings linked to each other by methylene groups. The chain structure of the free base of the polymers may be represented by the following formula:

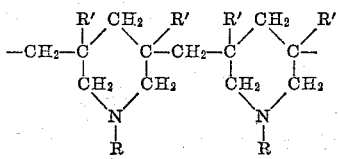

wherein R represents a saturated alkyl group or hydrogen and R' may be lower alkyl, halogen, nitrile, carboxyalkyl, oxyalkyl, and generally any of those groups which activate a vinyl double bond for polymerization, or hydrogen, and X is a whole number equal to the number of recurring chain units.

This invention also provides a free radical homopolymerization process for the production of the above polymeric materials.

The generally accepted theories of free radical catalyzed polymerization of olefins would predict that diolefins, having a functionality of 4, would produce cross-linked thermosetting polymers rather than linear thermoplastic polymers. For example, while styrene, a monomer having a functionality of 2, will polymerize to form a linear polymer, soluble in benzene, if as little as 0.01% of para-divinyl benzene, a monomer having a functionality of 4, is present, the product from the polymerization is not soluble in benzene. That is, a cross-linked material has been produced instead.

In the present invention, although the monomers employed have a functionality of 4, nevertheless it has been found that a linear polymer of a particular sort is produced. The discovery of this completely unexpected and unpredictable result has led to the preparation and production of the novel linear thermoplastic polymers which form the subject matter of this invention.

As indicated above, the structure of the novel polymers shows a repeating unit of a six-membered ring. This structure has been shown to exist by various procedures. For instance, one such polymer has been degraded by chemical reaction which is known to introduce new olefinic linkages into the molecule. Infrared and hydrogenation studies proves the presence of the olefinic linkages in the saturated polymer after the degradation treatment. Another polymer, shown to be saturated, was degraded by a chemical reaction which is known to break a six-membered ring to produce a linear benzoylamino carboxylic acid. The polymer was found to contain this linear benzoylamino carboxylic acid after this degradation. This unusual structure in the polymeric material appears to result from the following mechanism.

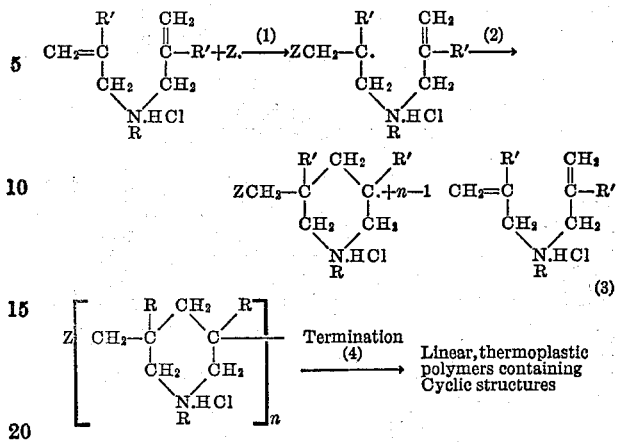

wherein Z· is a free radical and R is hydrogen or an alkyl group and R' is hyrogen, halogen, nitrile, or a lower alkyl group.

In order for this mechanism to take place, it is important that the unsaturated monomer be substantially symmetrical, particular as respects the double bond positions. Where a 1,6-diolefinic material is used which has two double bonds of different reactivity, a cross-linked polymer may be expected. For instance, allyl acrylate, and similar materials such as methallyl methacrylate, etc., have one reactive double bond and one comparatively unreactive double bond and do not yield the novel polymers of this invention. It is also important that the unsaturation specifically be a 1,6-di-unsaturation, for neither 1,5 nor 1,7 diolefins, for instance, will result in the linear thermoplastic ring-containing polymer. While normally five-membered rings are considered to form about as easily as six-membered rings, in the case of 1,5-diolefins, it has been found that the cross-linking reaction takes place in preference to the ring-forming reaction. In the case of 1,7-diolefins, a similar effect is observed as respects the relative ease of formation of the seven-membered ring.

Examples of the 1,6-diolefins which may be used in our invention include:

diallyl amine hydrochloride,
di-2-chloroallyl amine hydrochloride,
di-2-methallyl amine hydrochloride, diallyl-methyl amine hydrochloride,
diallyl-n.butyl amine hydrochloride,
diallyl-n.hexyl amine hydrochloride,
di-2-cyanoallyl-n.butyl amine hydrochloride,
di-2-cyanoallyl-n.decyl amine hydrochloride,
diallyl-n.dodecyl amine hydrochloride,
diallyl-n.tetradecyl amine hydrochloride,
diallyl-n.octodecyl amine hydrochloride,
diallyl-t.butyl amine hydrochloride,
di-2-chloroallyl-methylamine hydrochloride,
di-2-chloroallyl-butylamine hydrochloride,
di-2-methallyl-methylamine hydrochloride,
di-2-methallylpropylamine hydrochloride,
diallyl amine hydrobromide,
diallyl-methylamine hydrobromide,
dimethallyl amine hydrobromide,
di-2-chloroallyl amine hydrobromide,
di-2-bromoallyl amine hydrobromide,
di-2-bromoallyl-n-butyl amine hydrobromide,
di-2-bromallyl-n-propylamine hydrochloride.

The polymers prepared according to the present invention from the above monomers will contain all of the side chain radicals indicated as R and R' and may have widely varying molecular weights. Generally speaking, the molecular weight will vary from about 5,000 to about 30,000 and fiber-forming polymers can be obtained. The melting point of the polymers is considerably higher than the melting point of similar structures not containing the cyclic units, and thus the polymers are useful as fibers. While the polymers are isolated from the reaction mixture in the form of the hydrohalide salt, they may be easily transformed to the free base by conventional neutralization. Where the polymerization is carried out in water, the amine salt will be initially obtained as an aqueous gel and the addition of alkali precipitates the polymer as a solid.

The properties of the polymers will vary somewhat with the nature of the groups R and R'. For instance, when these represent chlorine, the polymer is resistant to burning and if R' represents a nitrile group, the product will be less soluble in hydrocarbon solvents and more resistant to fuel oils. In addition, the free bases will undergo reaction to form the usual amine derivatives such as amides, which can also be useful as film and fiber-forming materials, as for instance, the benzoyl derivatives.

The process for producing our polymers will generally correspond to general practices followed for free radical olefinic polymerizations. It is of particular value to use peroxygen catalysts such as di-tertiary butyl peroxide. Other peroxide catalysts include inorganic peroxides such as hydrogen peroxide and barium peroxide, etc.; and organic peroxides such as various dialkyl peroxides, alkyl hydrogen peroxides, and diacyl peroxides such as acetyl peroxide and benzoyl peroxide as well as peracids, such as peracetic acid and perbenzoic acid and salts of inorganic peracids such as ammonium and potassium persulfate. Cyclic peroxides can also be used such as tetralin hydroperoxide and cumene hydroperoxide. Other "free radical" catalysts such as azo compounds, e.g. azoisobutyronitrile, and oxygen may be employed as polymerization catalysts.

The polymerizations are carried out in the presence of a polar solvent such as water, dimethyl formamide, dimethyl sulfoxide, lower alkanols such as methanol, ethanol, propanol, etc., dioxane and the glycol ethers such as the lower alkyl ethers of ethylene glycol as monomethyl or dimethyl ethylene glycol; and other solvents of similar polarity. It is also possible to carry out the polymerization in a non-polar suspension or emulsion system in conventional fashion. Thus, it will be understood that the process does not depend upon the polar nature of the solvent except as it permits solution of the reactants. Temperature typically used between 0° and 100° C., preferably 50° to 75° C., but generally any temperature below the decomposition temperature of the monomer may be used. The reaction may be conducted under atmospheric pressure, or under autogenous pressure conditions. Generally, the reaction will be completed in a necessary period of time from about 1 to 24 hours depending on the temperature, but longer times such as for several days may be used. The polymer salt may be isolated as a solid material or the free polymer base may be obtained in conventional manner by neutralization with alkali of the aqueous solution.

In carrying out our process, it is important that the concentration level of the monomers be maintained below about 80%. While this limitation is not observed with some other diolefinic monomers which can also form a six-membered ring in a polymer chain, as with acrylic anhydride and quaternary salts of dially dialkyl amine, when secondary dallyl amine hydrohalide salts and tertiary diallyl monoalkyl amine hydrohalides are polymerized at high concentrations, extensive cross-linking can occur. Thus, in order to obtain a linear water-soluble secondary or tertiary amine salt, it is necessary to keep the monomer concentration below 80%, preferably below about 65%. The polymerization reaction becomes rather slow below concentrations of about 20% and hence it is desirable to carry out the reaction above this level.

The following examples will illustrate the principles of our invention, but it will be understood that it is not limited to the specific embodiments shown therein. The nomenclature adopted with respect to the reference numbers, indicated as "-(3,(5)-," is designed to point out that the linking methylene groups are attached to the 3 and 5 carbon atoms of respectively adjacent rings and to distinguish the polymers from a material having a "-3,5-" methylene bridge across a single one of the rings.

EXAMPLE I

*Poly-(3,(5)-methylenepiperidine hydrochloride and free amine polymer*

Ten grams of diallylamine hydrochloride (M.P. 164–65°) was dissolved in 5 ml. of water and treated with 0.30 g. of 60% t-butyl-hydroperoxide solution. The solution was placed in an oven set at 60° and allowed to remain for 72 hours. The yield of dry polymer salt was ten grams. The product was soluble in hot water. It is insoluble in cold ethanol, ethyl acetate, and acetic acid. After treating the product with an ethanol-acetone mixture, it exhibited quite pronounced elasticity. The polymer was converted to the benzamide by the Schotten-Baumann reaction, and oxidized with aqueous potassium permanganate to the poly(2-benzoylaminovaleric acid. Neutralization of the polymer salt yielded the free amine polymer.

EXAMPLE II

*Poly-(3,(5)-methylenepiperidine hydrobromide*

Three and seventy-nine one hundredths grams of diallylamine hydrobromide was dissolved in 1.9 ml. of water, and 0.12 g. of 60% t-butyl-hydroperoxide added. The solution was kept in an oven at 65° for 96 hours. After drying under vacuum and extraction with acetone, the polymer was obtained. Melting point, above 360° C. The polymer is soluble in water.

EXAMPLE III

*Poly-(3,(5)-methylene-N-methylpiperidine hydrochloride and free amine polymer*

Ten grams of diallyl methyl amine hydrochloride was polymerized according to the procedure of Example I using 0.32 gram of azoisobutyronitrile as the catalyst. The dry polymer salt was quantitative and the polymer was soluble in hot water but insoluble in cold ethanol, ethyl acetate, and acetic acid. The free base, obtained by neutralization of an aqueous solution of the salt, was soluble in chloroform, dimethyl formamide, and other solvents in similar polarity.

EXAMPLE IV

*Poly-(3,(5)-methylene-3,5-dichloropiperidine hydrobromide and free amine polymer*

Ten grams of di-2-chloroallyl amine hydrobromide was polymerized in 5 ml. dimethyl formamide with 0.4 gram of peracetic acid at about 50° C. for about 72 hours. After neutralization, a quantitative yield of a high-melting free amine polymer was obtained.

EXAMPLE V

*Poly-(3,(5)-methylene-3,5-dimethyl piperidine hydrochloride and free amine polymer*

Ten grams of di-methallyl amine hydrochloride was polymerized in 8 ml. of water with 0.8 gram of ammonium persulfate at a temperature of about 80° C. for about 24 hours. A substantially quantitative yield of a dry solid polymer was obtained which was soluble in water. The high-melting free amine polymer was obtained by neutralization.

EXAMPLE VI

*Poly-(3,(5)-methylene-3,5-dicyanopiperidine hydrochloride and free base*

Ten grams of di-2-cyanoalkyl amine hydrochloride in 7 grams of dimethylformamide was polymerized according to the procedure of Example I and a substantially quantitative yield of the polymer hydrochloride salt was obtained. Neutralization with alkali of an aqueous solution of the salt yielded the polymer free base.

It will be appreciated that, while our invention has been described with reference to certain specific embodiments thereof, the principle and scope thereof is limited only by the following claims.

We claim:

1. A fiber- and film-forming linear homopolymer having a repeating unit of the structure:

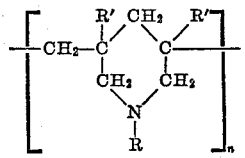

wherein R is selected from the group consisting of lower alkyl and hydrogen, R' is selected from the group consisting of lower alkyl, halogen, nitrile, carboxyalkyl, oxyalkyl, and hydrogen, and $n$ is an integer representing the number of said units in the polymeric chain.

2. A homopolymer according to claim 1, wherein R is a lower alkyl group.

3. A homopolymer according to claim 1, wherein R' is a lower alkyl group.

4. A homopolymer according to claim 1, wherein R' is a halogen atom.

5. A homopolymer according to claim 1, wherein R' is a nitrile radical.

6. A homopolymer according to claim 1, wherein R' is a hydrogen atom.

7. A process for the production of a fiber- and film-forming linear homopolymer having a repeating unit of the structure:

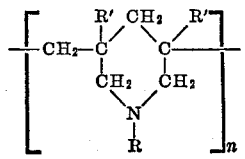

wherein R is selected from the group consisting of lower alkyl and hydrogen, R' is selected from the group consisting of lower alkyl, halogen, nitrile, carboxyalkyl, oxyalkyl, and hydrogen, and $n$ is an integer representing the number of said units in the polymeric chain; which comprises homopolymerization of the hydrohalide salt of a symmetrical dialkylamine having the formula:

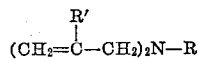

wherein R and R' have the meaning stated above, by treating it in an inert solvent therefor at a concentration from about 20% to 80% by weight and at a temperature below its decomposition temperature with a free radical catalyst, and thereafter neutralizing the polymer hydrohalide salt to produce the said linear homopolymer.

8. The process of claim 7, wherein said hydrohalide salt is a hydrochloride salt.

9. The process of claim 7, wherein said concentration does not exceed 65%.

10. The process of claim 7, wherein said solvent is water.

11. The process of claim 7, wherein said catalyst is a peroxide catalyst.

12. The process of claim 11, wherein said peroxide catalyst is di-tert.butyl peroxide.

13. The process of claim 7, wherein said catalyst is azoisobutyronitrile.

14. The process of claim 8, wherein said catalyst is present in an amount from about 0.5 to 20% by weight of said amine hydrochloride.

15. The process of claim 14, wherein the amount of said catalyst does not exceed about 8% by weight of said amine hydrochloride.

References Cited in the file of this patent

Butler et al.: "Jour. Am. Chem. Soc.," vol. 71, pages 3120–3122 (September 1949). (Copy in Sci. Library.)

Butler et al.: "Jour. Am. Chem. Soc.," vol. 73, pages 895–896 (March 1951). (Copy in Sci Libr.)

"Chemical and Engineering News," March 11, 1957, pages 22 and 24. (Copy in Sci. Libr.)

UNITED STATES PATENT OFFICE

CERTIFICATE OF CORRECTION

Patent No. 2,926,161            February 23, 1960

George B. Butler et al.

It is hereby certified that error appears in the above numbered patent requiring correction and that the said Letters Patent should read as corrected below.

In the grant, lines 3 and 4, and 13, and in the heading to the printed specification, line 5, name of assignee, for "Peninsular Chem Research, Inc." read -- Peninsular ChemResearch, Inc. --.

Signed and sealed this 9th day of August 1960.

(SEAL)
Attest:

KARL H. AXLINE
Attesting Officer

ROBERT C. WATSON
Commissioner of Patents